United States Patent
Tokarz et al.

(10) Patent No.: US 6,361,109 B1
(45) Date of Patent: Mar. 26, 2002

(54) SEAT CUSHION HEIGHT ADJUSTER

(75) Inventors: Stephen P. Tokarz, New Boston; Rabindranath Persad, Brighton, both of MI (US)

(73) Assignee: Magna Seating Systems Inc., Aurora (CA)

(*) Notice: Subject to any disclaimer, the term of this patent is extended or adjusted under 35 U.S.C. 154(b) by 0 days.

(21) Appl. No.: 09/671,497

(22) Filed: Sep. 27, 2000

Related U.S. Application Data
(60) Provisional application No. 60/156,150, filed on Sep. 27, 1999.

(51) Int. Cl.[7] .................................................. B60N 2/02
(52) U.S. Cl. .................. 297/344.15; 297/330; 297/338; 248/421
(58) Field of Search ....................... 297/344.12, 344.15, 297/338, 336; 248/421

(56) References Cited

U.S. PATENT DOCUMENTS

| | | | |
|---|---|---|---|
| 2,784,764 A | * 3/1957 | Rigby et al. ................. | 248/421 |
| 4,428,553 A | 1/1984 | Pallant | |
| 4,470,318 A | 9/1984 | Cremer et al. | |
| 4,556,185 A | 12/1985 | Takagi | |
| 4,648,575 A | 3/1987 | Kawade | |
| 4,786,107 A | * 11/1988 | Crockett ..................... | 297/330 |
| 4,828,213 A | 5/1989 | Saito et al. | |
| 4,995,680 A | * 2/1991 | Fujii .......................... | 248/421 |
| 5,094,419 A | 3/1992 | Nini et al. | |
| 5,123,622 A | 6/1992 | Matsumoto et al. | |
| 5,143,421 A | 9/1992 | Voss et al. | |
| 5,286,076 A | 2/1994 | DeVoss et al. | |
| 5,337,992 A | 8/1994 | Satoh et al. | |
| 5,501,422 A | 3/1996 | Chinomi | |
| 5,573,219 A | 11/1996 | Chinomi | |
| 5,586,740 A | 12/1996 | Borlingaus et al. | |
| 5,709,363 A | 1/1998 | Matsuhashi | |
| 5,709,364 A | 1/1998 | Araki et al. | |
| 5,735,500 A | 4/1998 | Borlinghaus et al. | |
| 5,741,000 A | 4/1998 | Goodbred | |
| 5,775,661 A | 7/1998 | Matsumoto et al. | |
| 5,806,824 A | 9/1998 | Isomura et al. | |
| 5,863,098 A | 1/1999 | Kojima et al. | |
| 5,871,195 A | 2/1999 | Gauger | |
| 6,095,475 A | * 8/2000 | Willms et al. ......... | 297/344.15 |

* cited by examiner

*Primary Examiner*—Anthony D. Barfield
(74) *Attorney, Agent, or Firm*—Clark Hill PLC (57) ABSTRACT

A seat cushion assembly includes a seat cushion frame operatively coupled to a seat track assembly by a seat cushion height adjuster for selectively positioning the seat cushion frame between a raised position and a lowered position. The seat cushion height adjuster includes front pivot shaft and rear pivot shaft journaled to the seat track assembly. A front pair of pivot links pivotally interconnect the seat cushion frame to the front pivot shaft and a rear pair of pivot links pivotally interconnect the seat cushion frame to the rear pivot shaft. A horizontal link interconnects each of the pairs of front and rear pivot links for synchronized movement. The adjuster further includes a powered drive assembly having a motor and gear box supported by a motor bracket between the front and rear pivot shafts for driving a screw shaft. A screw nut is threadedly coupled to the screw shaft for movement therealong. A torque bracket is coupled between the screw nut and the rear pivot shaft for rotating the rear screw shaft. When the screw shaft is rotated by the motor, the screw nut travel along the shaft and rotates the torque bracket and rear pivot shaft. The rear pivot shaft rotates the rear pivot links about an arcuate path to raise or lower the rear of the seat cushion frame. The horizontal links rotate the front pivot links about an arcuate path to simultaneously raise or lower front of the seat cushion frame.

10 Claims, 6 Drawing Sheets

SEAT CUSHION HEIGHT ADJUSTER

This application claims benefit of provisional application Ser. No. 60/156,150 filed Sep. 27, 1999.

BACKGROUND OF THE INVENTION

1) Field of the Invention

The subject invention relates to an automotive seat cushion height adjustment assembly for adjusting the height of a seat cushion.

2) Description of the Related Art

Manual and power lift devices, or height adjusters, for automobile seats are commonly known in the automotive industry. Many of these devices allow an operator to raise or lower either the front of the seat, the rear of the seat, or both the front and rear of the seat. Typically, in order to raise both the front and rear, separate mechanisms are provided for raising the front of the seat independently of the rear of the seat.

Raising the front of the automotive seat independently of the rear of the seat requires a more complicated design, and typically, two independent actuators. If the seat is manual, then two levers or knobs are required, or alternatively, if the seat is power, then two motors are required. This technique of raising an automotive seat makes raising the front portion of the seat parallel to the rear portion of the seat difficult.

Additionally, traditional methods of raising automotive seats are not modular, and involve components which are not interchangeable or adaptable to different vehicle seats and vehicle configurations.

SUMMARY OF THE INVENTION

A seat cushion assembly for use with a seat assembly of an automotive vehicle comprising a seat cushion frame having an inboard support member spaced from and parallel to an outboard support member wherein each of the inboard and outboard support members extend longitudinally between a front end and a rear end. A seat mounting assembly having an inboard mounting member spaced from and parallel to an outboard mounting member is adapted to mount the seat assembly to the vehicle. The assembly further includes a driven pivot shaft coupled to and extending between the inboard and outboard mounting members adjacent one of the ends of the seat cushion frame and a slave pivot shaft coupled to and extending between the inboard and outboard mounting members adjacent the other end of the seat cushion frame. A first pair of links interconnect the driven pivot shaft to the inboard support member and the outboard support member and a second pair of links interconnect the slave pivot shaft to the inboard support member and the outboard support member. A drive assembly is coupled to the driven pivot shaft for selectively rotating the shaft and pivoting the first pair of links to move the associated end of the seat cushion frame between a lowered position adjacent the seat mounting assembly and a raised position spaced above the seat mounting assembly. A joining link is interconnected between the first pair of links and the second pair of links for rotating the slave pivot shaft and pivoting the second pair of links to simultaneously move the associated other end of the seat cushion frame between the lowered position and the raised position upon actuation of the drive assembly.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
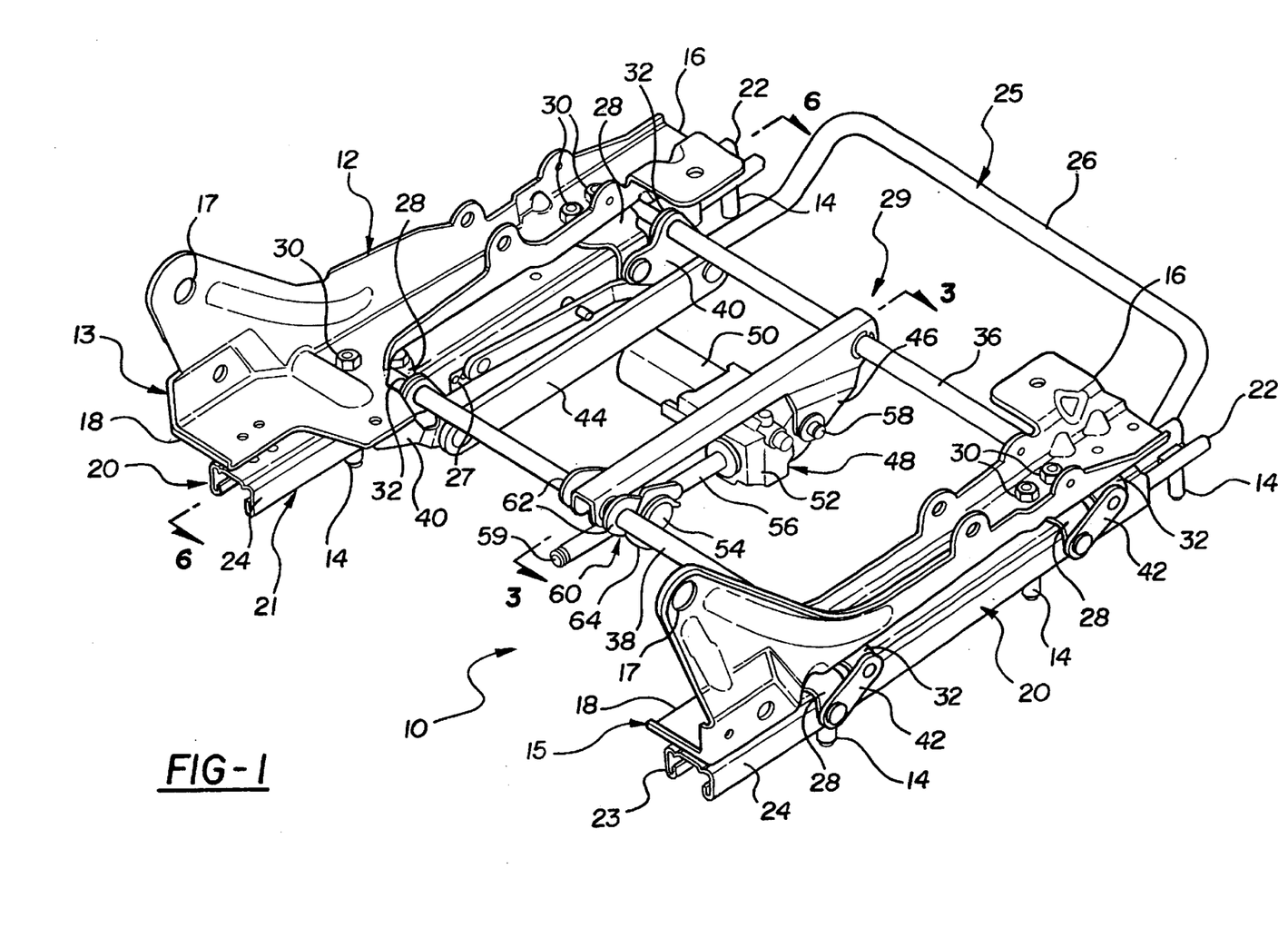
FIG. 1 is a perspective view of a seat cushion height adjuster assembly in accordance with the subject invention in the lowered position.
Figure 2:
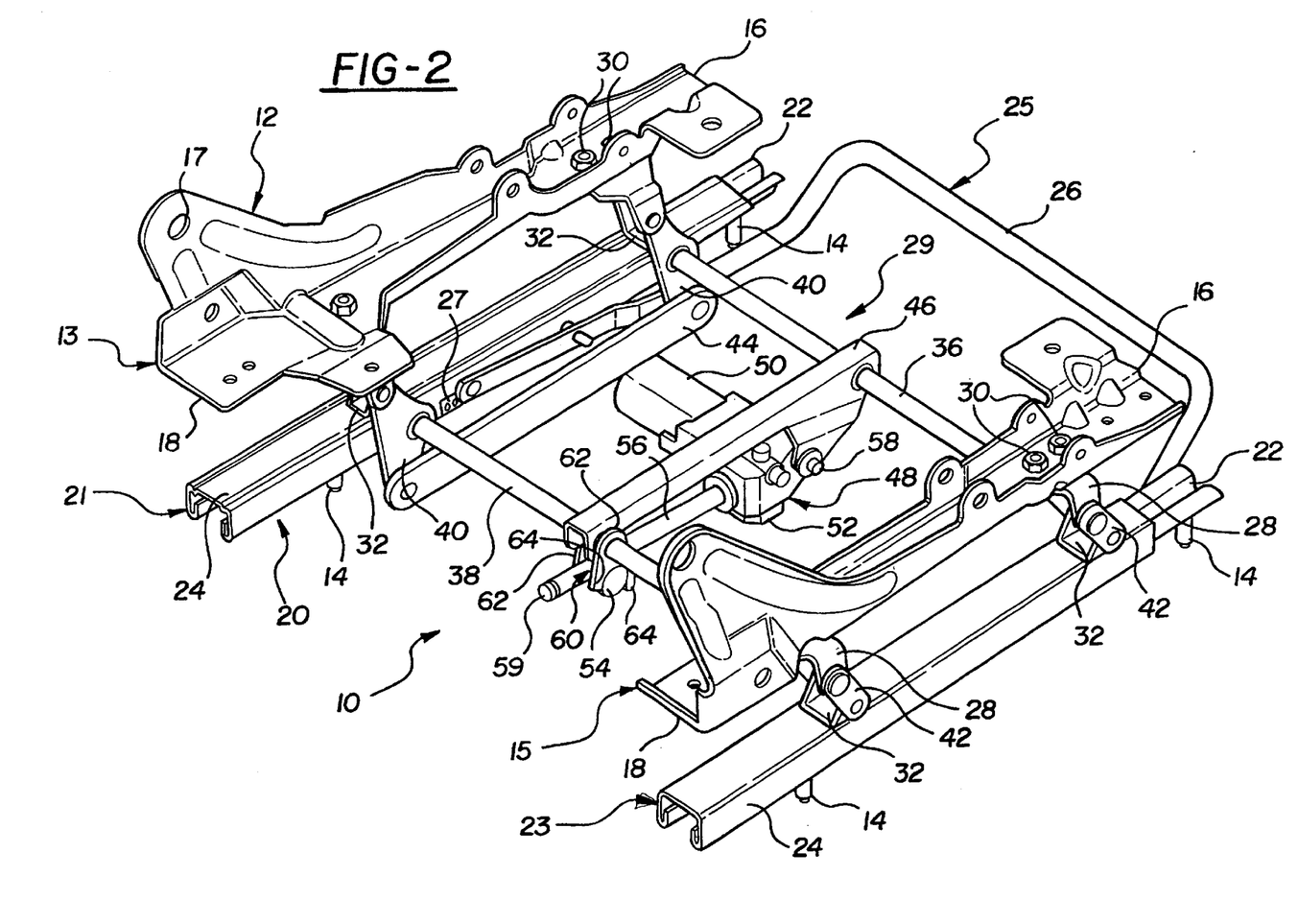
FIG. 2 is a perspective view of the seat cushion height adjuster assembly of FIG. 1 in the raised position.

Referring to the Figures, wherein like numerals indicate like or corresponding parts throughout the several views, a seat cushion assembly is generally shown at 10 in FIGS. 1 and 2 for supporting an occupant is a seat of an automotive vehicle. The seat cushion assembly 10 includes a seat cushion frame 12 having an inboard support member 13 and an outboard support member 15 spaced from and parallel to the inboard support member 13. Each of the inboard and outboard support members 13, 15 extended longitudinally between a front end 16 and rear end 18. Each of the inboard and outboard support members 13, 15 further include a pivot aperture 17 for pivotally receiving and mounting a seat back assembly as is commonly known in the art. A seat cushion suspension system is also commonly secured laterally between the inboard and outboard support members 13,15 for supporting a contoured cellular foam pad encased in a trim cover as is also commonly known in the art.

Figure 4:
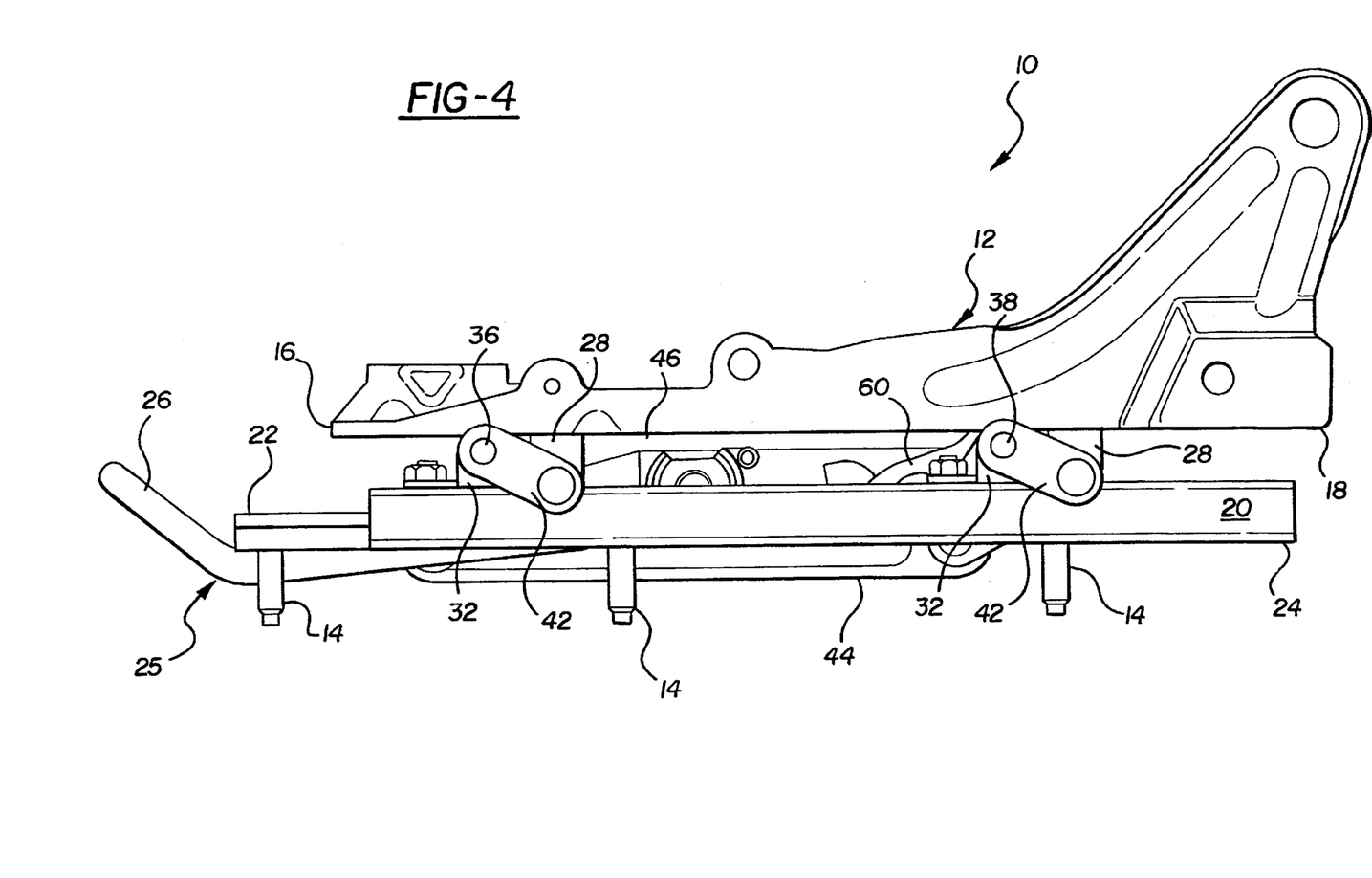
FIG. 4 is a side view of the adjuster assembly.
Figure 5:
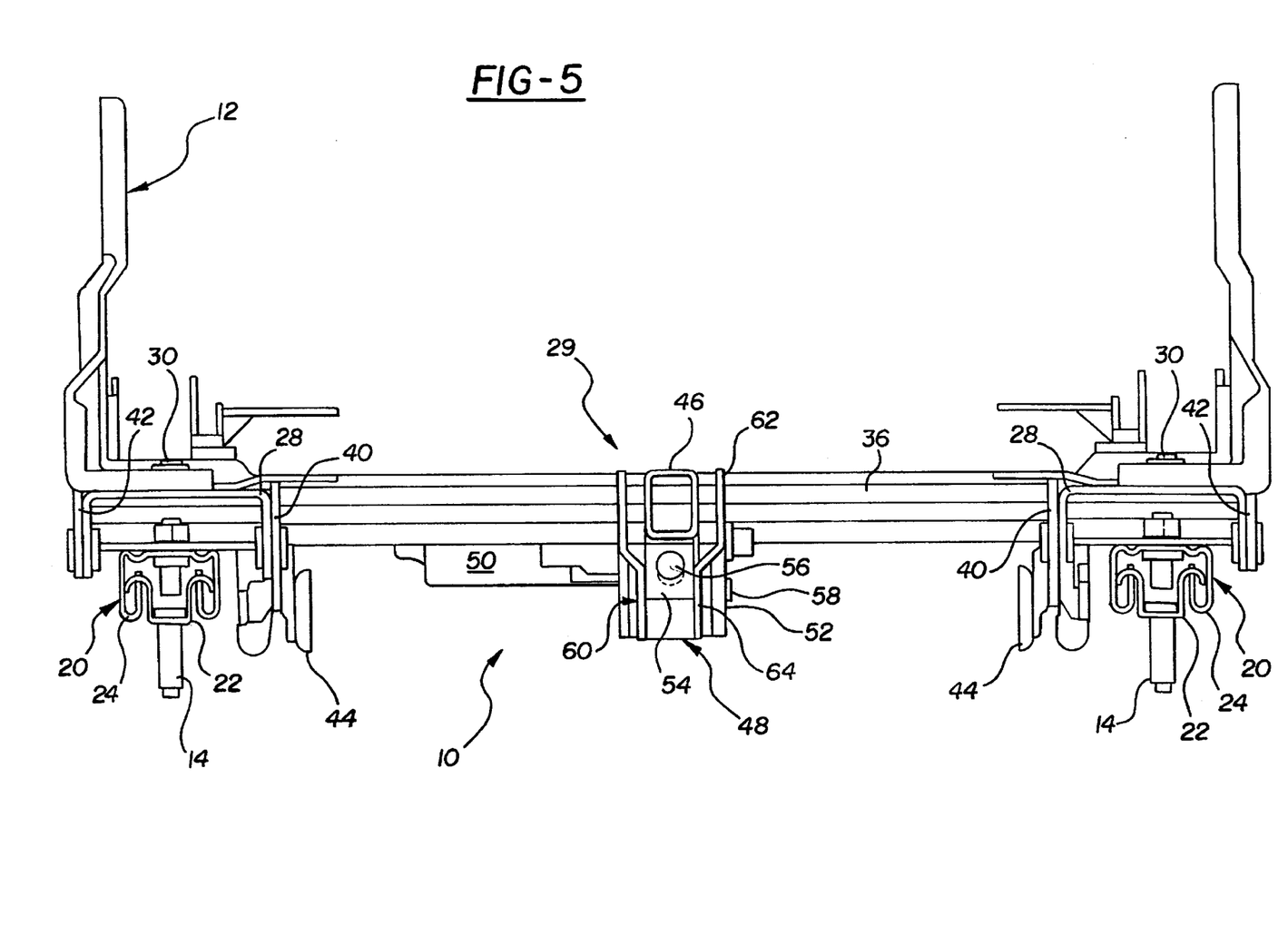
FIG. 5 is a rear view of the adjuster assembly.
Figure 6:
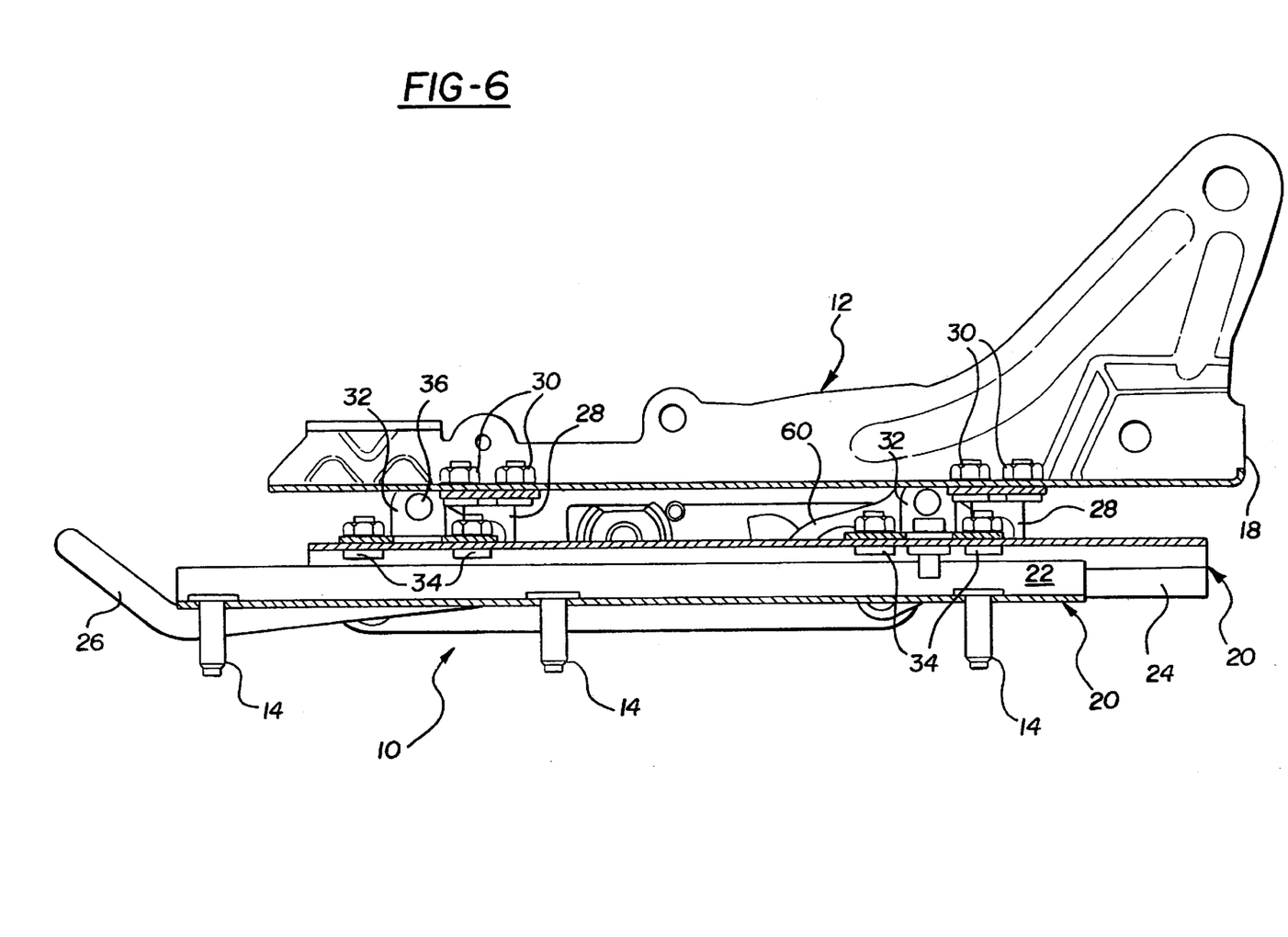
FIG. 6 is a partially cross-sectional view taken along line 6—6 of FIG. 1.

The seat assembly 10 further includes a seat mounting assembly 20 for mounting the seat assembly to the floor of the vehicle. The seat mounting assembly 20 includes an inboard mounting member 21 spaced from and parallel to an outboard mounting member 23. In the preferred embodiment shown, the seat mounting assembly 20 includes a seat track assembly 20. The seat cushion frame 12 is operatively coupled to the seat track assembly 20 which is in turn mounted to the floor of the vehicle by mounting bolts 14 in order to fixedly secure the vehicle seat to the vehicle. The seat track assembly 20 may be of any suitable design and may have manual or power adjustment as is known in the seat track art. As is shown in FIGS. 1, 4 and 5, the seat track assembly 20 of this type includes an inboard track 21 and an outboard track 23 spaced from and parallel to the inboard track 21. Each of the inboard and outboard tracks 21, 23 include a longitudinally extending lower track member 22 and a longitudinally extending upper track member 24 slidably interconnected to the lower track member 22. An adjustment mechanism 25 including an adjustment bar 26 disposed between the inboard and outboard tracks 21, 23 and a locking mechanism 27 operatively interconnected between the upper 22 and lower 24 track members provides for incremental fore and aft adjustment of the seat cushion assembly 10. It should be appreciated that the seat mounting assembly may also include a fixed member, such as a riser, as is commonly known in the art, for supporting and mounting the seat assembly without providing for incremental fore and aft adjustment without varying from the scope of the invention.

The seat cushion assembly 10 further includes a seat cushion height adjuster assembly 29 operatively coupled between the seat cushion frame 12 and the seat track assembly 20 for selectively positioning the seat cushion frame 12 between a lower position immediately adjacent the seat track assembly 20, as shown in FIG. 1, and a raised position spaced above the seat track assembly 20, as shown in FIG. 2.

More specifically, the inboard support member 13 is coupled to the upper track 24 of the inboard track 21 and the outboard support member 15 is coupled to the upper track 24 of the outboard track 23. Specifically, the adjuster assembly 29 includes four sets of pivotal links 40, 42 with one set mounted at the front 16 and rear 18 of each of the inboard and outboard support frames 13, 15. The seat cushion frame 12 includes four generally U-shaped mounting plates 28, one riveted or connected by bolts 30 to the bottom of each of the inboard and outboard support frames 13, 15 adjacent the front 16 and rear 18 of the seat cushion frame 12. The adjuster assembly 29 also includes four pivot shaft support brackets 32, one riveted or connected by bolts 34 to the top of each of the upper tracks 24 adjacent the opposite ends thereof. A front, or slave, pivot shaft 36 extends laterally between the inboard and outboard tracks 21, 23 and is connected between the two pivot shaft support brackets 32 mounted to the spaced apart upper tracks 24 at the front 16 of the seat cushion frame 12. Similarly, a rear, or driven, pivot shaft 38 extends laterally between the inboard and outboard tracks 21, 23 and between the two pivot shaft support brackets 32 mounted to the spaced apart upper tracks 24 at the rear 18 of the seat cushion frame 12. The pivot shafts 36, 38 are journaled to and free to rotate within the pivot shaft support brackets 32. Each of the seat cushion frame mounting plates 28 are pivotally connected to one end of a pivot link 40 on the inside of the support frames 13, 15 and to one end of a pivot link 42 on the outside of the support frames 13, 15 of the seat cushion frame 12. The opposite end of the inner 40 and outer 42 pivot links are fixedly attached by welding or some other suitable means to the distal ends of the pivot shafts 36, 38, respectively. This connects the seat cushion frame 12 to the upper track members 24.

When either of the pivot shafts 36, 38 is rotated, the inner 40 and outer 42 pivot links mounted at the ends thereof rotate as well. Referring to FIG. 4, when the pivot shafts 36, 38 are rotated counter-clockwise, the pivot links 40, 42 swing in an arc. The mounting plates 28, which are pivotally connected to the end of the pivot links 40, 42, will follow an arcuate path about the axis of the pivot shaft 36, 38, thereby lifting the mounting plates 28 and the inboard and outboard support members 13, 15 of the seat cushion frame 12 upward. A horizontal joining link 44 is mounted parallel to each of the inboard and outboard track 21, 23 and to the inner pivot links 40 on either side of the assembly 10. Referring to FIG. 1, only one horizontal joining link 44 is shown, however, there is a matching horizontal joining link 44 on the opposite side of the assembly 10 as shown in FIG. 5. The horizontal joining links 44 connect the front and rear inner pivot links 40 on either side of the assembly 10, and insure that all four sets of pivot links will rotate in unison so that each of the inboard and outboard support members 13, 15 of the seat cushion frame 12 are lifted evenly between the lowered position and the raised position. That is, if a rotational force is applied to only one of the pivot shafts 36 or 38; for instance the rear shaft 38, the horizontal joining link 44 which is connected to the inner pivot link 40 at the rear 18 will transfer that motion to the inner pivot link 40 at the front 16.

Referring to FIGS. 1 and 2, the adjuster assembly 29 further includes a motor bracket 46 which extends longitudinally between the front and rear pivot shafts 36, 38. The motor bracket 46 is pivotally mounted at opposing distal ends to the front and rear pivot shafts 36, 38 to allow the pivot shafts 36, 38 to rotate within the motor bracket 46 while the motor bracket 46 maintains a stationary position. The adjuster assembly 10 includes a powered drive assembly 48 to power actuate the raising and lowering of the seat cushion frame 12. The powered drive assembly 48 includes a motor 50, a power screw gear box 52, a power screw nut 54, and a power screw shaft 56. The motor 50 and gear box 52 are pivotally mounted to the motor bracket 46 by a motor pivot pin 58, and the power screw shaft 56 extends rearwardly from the gear box 52 to a distal end 59 rearward of the rear shaft 38. The power screw shaft 56 is of a length that allows it to extend beyond the rear pivot shaft 38. A torque bracket 60 is fixedly mounted by welding or some other suitable means at or near the center of the rear pivot shaft 38 between the inner pivot links 40. The torque bracket 60 is mounted to the rear pivot shaft 38 by two extending collars 62 which straddle the distal end of the motor bracket 46. The torque bracket 60 also includes two grasping legs 64 which pivotally support the power screw nut 54 therebetween. The power screw nut 54 is free to rotate within the grasping legs 64, and includes a threaded bore for receiving the threaded power screw shaft 56. The power screw shaft 56 is free to rotate within the threaded power screw nut 54.

Figure 3:
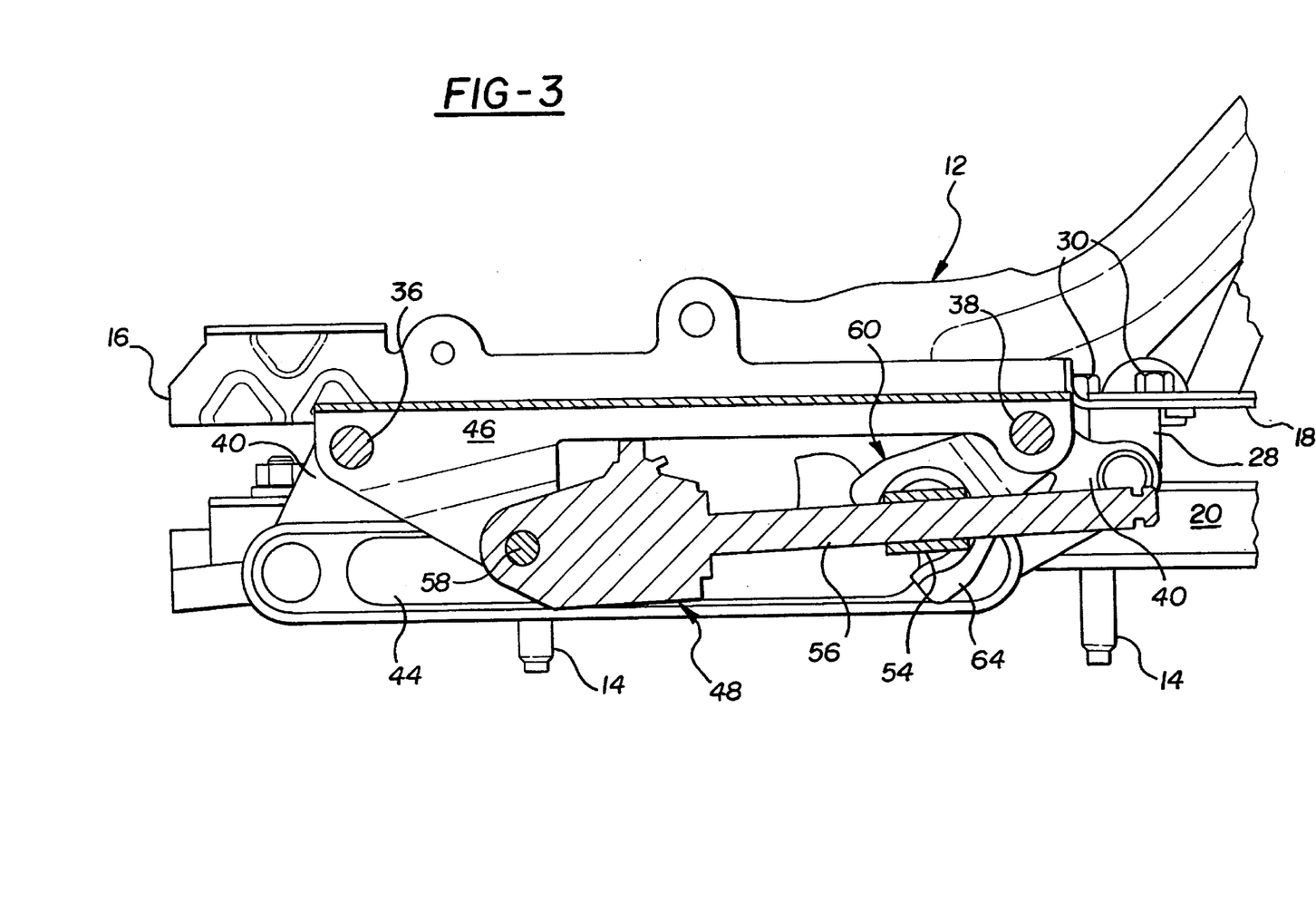
FIG. 3 is a partially cross-sectional view taken along line 3—3 of in FIG. 1.

Referring to FIG. 2, as the power screw motor 50 and gear box 52 drives the power screw shaft 56, the power screw nut 54 will be threaded either outwardly away from the gear box 52 and towards the distal end 59 of the shaft 56 or inwardly towards the gear box 52 depending on the direction of the rotation of the shaft 56. As should be appreciated, the motor 50 could be replaced with a knob or handle to allow a person to manually turn the power screw shaft 56. Referring to FIG. 3, the adjuster assembly 10 is shown with the power screw nut 54 at its fully retracted position. Because the power screw nut 54 is mounted within the grasping fingers 64 of the torque bracket 60, the power screw nut 54 cannot move any closer to the power screw motor 50. The position in FIG. 3 also illustrates the seat cushion frame 12 in the fully lowered position.

In operation, when the power screw motor 50 forces the power screw shaft 56 to turn, the power screw nut 54 is not allowed to rotate along the axis of the power screw shaft 38, therefore, the power screw nut 54 will be forced to thread outwardly along the power screw shaft 56. As the power screw nut 54 moves outwardly along the power screw shaft 56, the torque bracket 60 is forced to rotate counter-clockwise, as shown in FIG. 3. The displacement of the power screw nut 54 from the axis of the rear pivot shaft 38 will cause the nut 54 to travel along an arcuate path about the rear pivot shaft 38, thereby causing the power screw motor 50, gear box 52, and shaft 56 to pivot slightly about the motor pivot pin 58. As the torque bracket 60 rotates, the rear pivot shaft 38 is also rotated by the collars 62. The torque bracket 60 will continue to rotate with the rear pivot shaft 38 and the power shaft nut 54 will continue to move along the power screw shaft 56 until further movement is restricted by the power screw shaft 56 contacting the torque bracket 60 as the torque bracket 60 rotates to the far, or rearward, side of the rear pivot shaft 38. The overall length of the power screw shaft 56 is sufficient to accommodate rotation to this point.

Referring to FIG. 4, as the rear pivot shaft 38 is rotated counter-clockwise, the inner and outer pivot links 40, 42 are forced to rotate in a counter-clockwise arc about the rear pivot shaft axis 38. The mounting plates 28 which are pivotally connected to the end of the pivot links 40, 42 will follow an arcuate path about the axis of the pivot shaft 38, thereby lifting the mounting plates 28 and the seat cushion frame 12 upwardly to the raised position shown in FIG. 2. The power screw shaft 56 will stop rotation before the pivot links 40, 42 reach the uppermost point along the path of rotation around the rear pivot axis 38. As the rear inner pivot links 40 rotate, the horizontal joining links 44 attached thereto will transfer the rotation to the front inner pivot links 40, thereby causing the uniform, or simultaneous, lifting of the front 16 and rear 18 of the seat cushion frame 12.

When the seat cushion frame 12 is in the fully raised position of FIG. 2, the rotation of the power screw shaft 56 can be reversed, thereby causing the power screw nut 54 to move back along the power screw shaft 56 towards the power screw motor 50. In turn, the rear pivot shaft 38 and the inner and outer pivot links 40, 42 will rotate in the clockwise direction of FIG. 4, allowing the mounting plates 28 to follow the arcuate path about the axis of the pivot shaft 38 to the lowered position.

Alternatively, the power drive assembly 48, including the screw nut 54 and screw shaft 56, may be coupled to the front pivot shaft 36 by the torque bracket 60 to rotationally drive the front pivot shaft 36 and links 40, 42 while the horizontal joining link 44 simultaneously drives the rear pivot shaft 38 and associated links 40, 42.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that the invention may be practiced otherwise than as specifically described.

What is claimed is:

1. A seat cushion assembly for use with a seat assembly of an automotive vehicle comprising:

a seat cushion frame having an inboard support member spaced from and parallel to an outboard support member wherein each of said inboard and outboard support members extend longitudinally between a front end and a rear end;

a seat mounting assembly having an inboard mounting member spaced from and parallel to an outboard mounting member;

a driven pivot shaft coupled to and extending between said inboard and outboard mounting members adjacent one of said ends of said seat cushion frame;

a slave pivot shaft coupled to and extending between said inboard and outboard mounting members adjacent said other end of said seat cushion frame;

a first pair of links interconnecting said driven pivot shaft to said inboard support member and said outboard support member;

a second pair of links interconnecting said slave pivot shaft to said inboard support member and said outboard support member;

a drive assembly coupled to said driven pivot shaft for selectively rotating said shaft and pivoting said first pair of links to move said associated end of said seat cushion frame between a lowered position adjacent said seat mounting assembly and a raised position spaced above said seat mounting assembly; and a joining link interconnected between said first pair of links and said second pair of links for rotating said slave pivot shaft and pivoting said second pair of links to simultaneously move said associated other end of said seat cushion frame between said lowered position and said raised position upon actuation of said drive assembly.

2. A seat cushion assembly as set forth in claim 1 wherein said drive assembly includes a powered motor and gear box operatively coupled to an elongated screw shaft for rotating said screw shaft through a screw nut coupled thereto.

3. A seat cushion assembly as set forth in claim 2 further including a torque bracket coupled between said driven pivot shaft and said screw nut for guiding said screw nut along said screw shaft during powered rotation of said screw shaft by said motor and gear box.

4. A seat cushion assembly as set forth in claim 3 wherein said torque bracket includes a collar fixedly secured to said driven pivot shaft and a leg extending from said collar and connected to said screw nut for supporting said screw nut.

5. A seat cushion assembly as set forth in claim 4 wherein said screw nut is threaded to said screw shaft for longitudinal travel therealong in response to rotation of said screw shaft by said motor and gear box.

6. A seat cushion assembly as set forth in claim 5 wherein said driven pivot shaft defines a rotation axis and screw nut travels longitudinally along said screw shaft to pivot said torque bracket about said rotation axis thereby rotating said driven pivot shaft.

7. A seat cushion assembly as set forth in claim 6 further including a motor bracket rotationally journaled to and supported between said driven pivot shaft and said slave pivot shaft for supporting said drive assembly.

8. A seat cushion assembly as set forth in claim 7 wherein said motor and gear box are pivotally supported to said motor bracket by a pivot pin for allowing said drive assembly to pivot about said motor bracket during said longitudinal travel of said screw nut along said screw shaft.

9. A seat cushion assembly as set forth in claim 8 wherein said seat mounting assembly includes a seat track assembly having an pair of upper tracks slidably coupled to a respective pair of lower tracks for providing incremental fore and aft adjustment of said seat cushion frame.

10. A seat cushion assembly for use with a seat assembly of an automotive vehicle comprising:

a seat cushion frame having an inboard support member spaced from and parallel to an outboard support member wherein each of said inboard and outboard support frames extend longitudinally between a front end and a rear end;

a seat mounting assembly having an inboard mounting member spaced from and parallel to an outboard mounting member;

a front pivot shaft coupled to and extending between said inboard and outboard mounting members adjacent said front end of said seat cushion frame;

a rear pivot shaft coupled to and extending between said inboard and outboard mounting members adjacent said rear end of said seat cushion frame;

a front pair of links interconnecting said front pivot shaft to said inboard support member and said outboard support member;

a rear pair of links interconnecting said rear pivot shaft to said inboard support member and said outboard support member;

a drive assembly coupled to said rear pivot shaft for selectively rotating said rear pivot shaft and pivoting said pair of rear links connected between said rear pivot shaft and said inboard and outboard mounting members to move said rear end of said seat cushion frame between a lowered position adjacent said seat mounting assembly and a raised position spaced above said seat mounting assembly; and a joining link interconnected between said front pair of links and said rear pair of links for rotating said front pivot shaft and pivoting said pair of front links to simultaneously move said front end of said seat cushion frame between said lowered position and said raised position upon actuation of said drive assembly.

* * * * *